United States Patent
Rochon et al.

(10) Patent No.: US 7,822,056 B2
(45) Date of Patent: Oct. 26, 2010

(54) LCR SWITCH WITH HEADER COMPRESSION

(75) Inventors: Michel Rochon, Kanata (CA); Adrian Alfred Ellsworth, Stittsville (CA); Vernon Joshua Stanley Dennis, Kanata (CA); Andre Poulin, Gatineau (CA)

(73) Assignee: Alcatel Lucent, Paris (FR)

( * ) Notice: Subject to any disclaimer, the term of this patent is extended or adjusted under 35 U.S.C. 154(b) by 50 days.

(21) Appl. No.: 12/397,955

(22) Filed: Mar. 4, 2009

(65) Prior Publication Data

US 2010/0226385 A1 Sep. 9, 2010

(51) Int. Cl.
*H04L 12/56* (2006.01)
(52) U.S. Cl. .................... 370/419; 370/395.4
(58) Field of Classification Search ........... 370/419, 370/395, 392, 235, 239, 389, 331, 232; 709/203, 709/224, 238, 239
See application file for complete search history.

(56) References Cited

U.S. PATENT DOCUMENTS

| | | | | |
|---|---|---|---|---|
| 6,480,489 B1 * | 11/2002 | Muller et al. | ............... | 370/389 |
| 6,640,239 B1 * | 10/2003 | Gidwani | ............... | 709/203 |
| 6,687,247 B1 * | 2/2004 | Wilford et al. | ............... | 370/392 |
| 7,343,423 B2 * | 3/2008 | Goguen et al. | ............... | 709/239 |
| 7,370,119 B2 * | 5/2008 | Provine et al. | ............... | 709/239 |
| 7,516,214 B2 * | 4/2009 | Gandhi | ............... | 709/224 |
| 7,657,706 B2 * | 2/2010 | Iyer et al. | ............... | 711/117 |
| 2002/0036984 A1 * | 3/2002 | Chiussi et al. | ............... | 370/232 |
| 2004/0100952 A1 * | 5/2004 | Boucher et al. | ............... | 370/389 |
| 2006/0047850 A1 * | 3/2006 | Singh Bhasin et al. | ...... | 709/238 |
| 2008/0212475 A1 * | 9/2008 | Oueslati et al. | ............. | 370/235 |
| 2009/0010162 A1 * | 1/2009 | Bergamasco et al. | ........ | 370/235 |
| 2009/0028046 A1 * | 1/2009 | Kanda et al. | ................ | 370/235 |
| 2009/0129342 A1 * | 5/2009 | Hwang et al. | ............... | 370/331 |
| 2009/0279549 A1 * | 11/2009 | Ramanathan et al. | .... | 370/395.4 |

OTHER PUBLICATIONS

M. Degermark, IP Header Compression, Network Working Group, Request for Comments: 2507, Feb. 1999, pp. 1-48.

* cited by examiner

*Primary Examiner*—Thong H Vu
(74) *Attorney, Agent, or Firm*—Kramer & Amado P.C.

(57) ABSTRACT

Various exemplary embodiments relate to a method and related network node including one or more of the following: maintaining a line card activity number at each line card in the node; receiving a first packet belonging to a flow; storing, at each line card, a flow record in a line card context identifier storage, wherein the flow record contains a flow activity number being initially set equal to a current value of the line card activity number; detecting, by the second line card, a change in designation to active and changing the value of the line card activity number maintained by the second line card; receiving a second packet belonging to the flow; and transmitting, to the decompressor node, an update packet including the flow context identifier and the flow identifying information, upon determining that the flow activity number is not equal to the updated line card activity number.

20 Claims, 4 Drawing Sheets

| FLOW INFORMATION | CONTEXT IDENTIFIER | FLOW ACTIVITY NUMBER |
| --- | --- | --- |
| 1.3.3.7/23<br>1.1.1.1/23 | 0 | 5 |
| 23.142.56.11/6882,<br>67.32.6.245/6884 | 1 | 3 |
| ... | ... | ... |

LCR SWITCH WITH HEADER COMPRESSION

TECHNICAL FIELD

Embodiments disclosed herein relate generally to compression of Internet Protocol (IP) headers and, more particularly, to resolution of difficulties in a system that implements IP header compression and line card redundancy.

BACKGROUND

Modern packet-switched networks accommodate a greater number of users and larger amount of traffic than ever before. Unfortunately, the services desired by users now require a much greater amount of bandwidth, while demanding near real-time service in many cases. Consider, for example, a typical user's experience with a mobile phone. While, several years ago, many users were content with voice-only service, many mobile phones now double as personal computers, providing access to streaming video, peer-to-peer applications, and other high bandwidth applications. Furthermore, non-mobile networks have also experienced a significant increase in traffic, as Voice Over Internet Protocol (VoIP), IP Television (IPTV), and similar services have gradually increased in popularity.

Service providers have struggled to keep pace with the ever-increasing bandwidth requirements. Given the significant expenses associated with adding additional equipment, service providers are reluctant to address this problem by simply increasing the capacity of the network. Instead, many service providers desire to decrease costs and simultaneously improve the user's quality of experience by optimizing the efficiency of data transfer over the network.

One such optimization relates to compression of headers associated with packets transferred over the network. In bandwidth-sensitive portions of the network, many service providers employ a header compression algorithm to decrease the amount of data sent over the network. As an example, this header compression may be implemented according to Request for Comments 2507, "IP Header Compression," published by the Internet Engineering Task Force (IETF). More specifically, during an initialization phase, a node known as a compressor sends a full header including a context identifier, which identifies the flow associated with the packet. A node known as a decompressor receives the full header and stores the associated context identifier. Subsequently, the compressor may send a "compressed" version of the header, which includes the context identifier, but omits much of the information included in the uncompressed header. Because the decompressor maintains a record of the context identifier and associated header information, the decompressor may reconstruct the uncompressed header using the information contained in the compressed version.

Many such compressors implement line card redundancy (LCR) in an effort to cope with problems such as hardware failure. In these systems, two or more line cards operate in parallel on incoming packets. One line card is designated active, while the other is designated inactive. Only packets sent by the active line card are actually transmitted through the network, while packets transmitted by the inactive line card are simply dropped. In this manner, upon detecting a failure in the active card, the compressor may perform an LCR switch, changing the designations of the active card to inactive and the inactive card to active. Thereafter, the packets processed by the previously inactive card are transmitted.

Without sharing of context identifiers between the two line cards, however, it is likely that the line cards will assign two different context identifiers to the same flow. Thus, while the decompressor may have stored a correlation between a flow and the context identifier assigned by the active line card, upon an LCR switch, the compressor will begin sending compressed header packets carrying the context identifier assigned by the previously inactive line card. The decompressor will either drop these packets if it has no record of this new context identifier, or will attach the wrong complete header to the compressed header packets if this new context identifier was associated with a different flow by the previously active line card.

For the foregoing reasons and for further reasons that will be apparent to those of skill in the art upon reading and understanding this specification, there is a need for a method and system to ensure proper transmission and receipt of packets belonging to a compressed flow upon an LCR switch.

SUMMARY

In light of the present need for a method and system to ensure proper transmission and receipt of packets belonging to a compressed flow upon an LCR switch, a brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various exemplary embodiments relate to a method and related network node to ensure proper transmission and receipt of packets belonging to a compressed flow upon an LCR switch, including one or more of the following: maintaining, at each line card, a line card activity number; receiving a first packet belonging to a flow; storing, at each line card, a flow record in a line card context identifier storage, wherein the flow record contains flow identifying information, a flow context identifier, and a flow activity number, the flow activity number being initially set equal to a current value of the line card activity number; detecting, by the second line card, a change in designation to active and subsequently changing the value of the line card activity number maintained by the second line card to an updated line card activity number; receiving a second packet belonging to the flow; determining, by the second line card, the flow activity number and the flow context identifier associated, in the line card context identifier storage, with the flow; and transmitting, to the decompressor node, an update packet including the flow context identifier and the flow identifying information upon determining that the flow activity number is not equal to the updated line card activity number. In some embodiments, a generation number associated with the flow is incremented, causing the line card to enter a slow start mode for the flow and to send a number of full header packets to the decompressor node.

Accordingly, various exemplary embodiments ensure proper transmission and receipt of packets belonging to a compressed flow upon an LCR switch. In particular, the various exemplary embodiments maintain a line card activity number at each line card. This activity number is changed whenever the status of the line card changes from inactive to active. According to these embodiments, by comparing the current line card activity number to a flow activity number stored when the flow was established, a line card can determine when a decompressor node's CID records are not reflective of the line card's CID assignments and must therefore be updated to ensure proper handling of compressed header packets.

BRIEF DESCRIPTION OF THE DRAWINGS

In order to better understand various exemplary embodiments, reference is made to the accompanying drawings, wherein.

DETAILED DESCRIPTION

Referring now to the drawings, in which like numerals refer to like components or steps, there are disclosed broad aspects of various exemplary embodiments.

Figure 1:
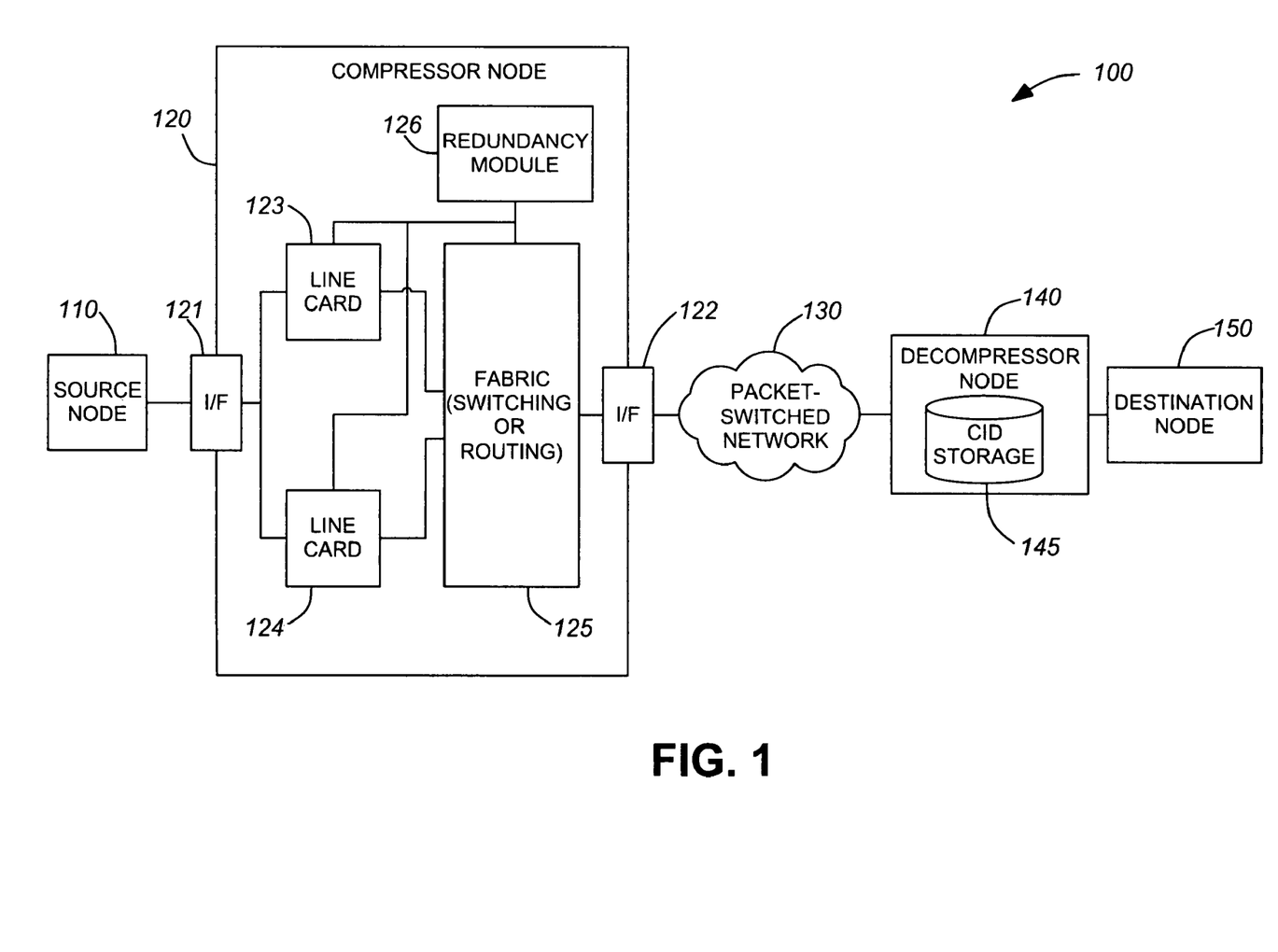
FIG. 1 is a schematic diagram of an exemplary system for ensuring the proper transmission and receipt of compressed header packets upon an LCR switch.

FIG. 1 is a schematic diagram of an exemplary system 100 for packet header compression, the system 100 implementing line card redundancy with packet header compression. In various exemplary embodiments, system 100, which may be a telecommunications network, includes source node 110, compressor node 120, packet-switched network 130, decompressor node 140, and destination node 150.

Source node 110 may be any device that transmits data to destination node 150. Thus, source node 110 may be, for example, a user node, such as a cell phone, personal digital assistant, personal or laptop computer, wireless email device, or any other device that supports wireless communications. Alternatively, source node 110 may be a network node that is responsible for forwarding data originating from a user node, such as a router or switch. As another alternative, source node 110 may be a service provider, server, or similar system that provides data to a user.

In various exemplary embodiments, compressor node 120 is a network node that receives data packets from source node 110, performs header compression on the packets, then forwards the packets to decompressor node 140 through packet-switched network 130. Thus, compressor node 120 may be a radio network controller, packet data serving node, or any other node located in a position in the network where compression of outgoing packet headers would be advantageous. Alternatively, compressor node 120 may be the same node as source node 110, such that source node 110 performs the compression itself.

Compressor node 120 may include two interfaces 121 and 122. Interface 121 may be connected to source 110 and operate to receive and transmit packets between source 110 and line cards 123, 124. Likewise, interface 122 may be connected to packet-switched network 130 and operate to receive and transmit packets between fabric 125 and decompressor node 140.

Compressor node 120 may further include two line cards 123, 124, a switching or routing fabric 125, and a redundancy module 126. Line cards 123, 124 may be substantially identical and operate in a redundant arrangement. Line cards 123, 124 may independently process each packet received from interface 121 and transmit each processed packet to switching or routing fabric 125. Redundancy module 126 may deem one of the two line cards 123, 124 active and the other of the two line cards 123, 124 inactive. Fabric 125 may then discard all packets received from the line card deemed inactive and forward all packets received from the line card deemed active. Alternatively, a multiplexor (not shown) may be situated between line cards 123, 124 and fabric 125. Such a multiplexor might determine which line card's processed packets will enter fabric 125.

The header compression performed by compressor node 120 may be performed independently in both line cards 123, 124 and may be accomplished in accordance with Request For Comments (RFC) 2507, published by the Internet Engineering Task Force. Thus, line cards 123, 124 may receive a packet from source node 110 via interface 121 and independently determine an appropriate context identifier (CID) for the flow associated with the packet.

The CID may be any value used to uniquely identify a flow between compressor node 120 and decompressor node 140. Thus, the CID may be, for example, a non-negative integer suitable for storage in 8 bits (values 0 to 255) or 16 bits (values 0 to 65,535) that is incremented each time a new flow is established. Values of a different number of bits may be used simultaneously, provided that the CIDs are kept unique. Line cards 123, 124 may also independently generate a value known as the generation, which is a value that is incremented or otherwise modified each time the context is changed. After generating the CID and generation value, line cards 123, 124 may store these values for subsequent retrieval.

When a packet received at line cards 123, 124 is the first packet in a flow, line cards 123, 124 may independently assign a new CID and generation to the flow, then send a full header for the packet to decompressor node 140. The full header may include the CID, generation, and all information required to identify the flow and reconstruct a uncompressed packet header. The CID is placed in, for example, the packet length field of the header or be used in lieu of the packet header.

When a received packet is a subsequent packet in the flow, line cards 123, 124 may independently access the information in the packet header, look up the corresponding CID and generation, then send a compressed packet including the CID and generation. For full headers, the CID may be placed in the packet length field of the header. Alternatively, for compressed packets, the CID may be used in lieu of the packet header. The compressed packet may exclude information that remains constant between packets, such as the source address, source port, destination address, destination port, time-to-live (TTL), etc.

It should be noted that line cards 123, 124 need not send a compressed header for every subsequent packet. In particular, line cards 123, 124 may periodically send a full header as an update packet to ensure that decompressor node 140 has received and maintained the proper CID. Line cards 123, 124 may at times enter a slow start mode as described in RFC 2507, transmitting full header packets separated by an exponentially increasing number of compressed header packets. For example, one of line cards 123,124 in slow start mode may transmit, in order, one full header packet, one compressed header packet, one full header packet, two compressed header packets, one full header packet, four compressed header packets, and so on.

After line cards 123, 124 generate or retrieve a CID for a particular flow, compressor node 120 may send the packet processed by the active line card across packet-switched network 130. Packet-switched network 130 may be any network for which compression of headers is advantageous. For example, packet-switched network 130 may be a mobile portion of a Global System for Mobile Communications (GSM), Universal Mobile Telecommunications System (UMTS), or other wireless network. Alternatively, packet-switched network 130 may be a portion of a network in which satellite-based communications are implemented. Still further, packet-switched network 130 may be a portion of a wireline network in which bandwidth is limited, such as T1 or DS1 leased lines. Suitable variations of packet-switched network 130 will be apparent to those of ordinary skill in the art.

Decompressor node 140 may be a network node that receives data packets from compressor node 120, performs header decompression on the packets, then forwards the packets to destination node 150. Thus, decompressor node 140 may be a radio network controller, packet data serving node, or any other node. Alternatively, decompressor node 140 may be the same node as destination node 150, such that destination node 150 performs the decompression itself.

At initiation of a flow or during periodic CID updates, decompressor node 140 obtains a full header from compressor node 120. This header may contain, for example, a source IP address, source port, destination IP address, destination port, and any other information stored in packet headers that will be apparent to those of ordinary skill in the art. The full header contains a CID and generation value for the flow. Decompressor node 140 extracts the CID and generation value, and stores these values along with the other header information, for example, in CID storage 145.

Subsequently, when decompressor node 140 receives a compressed header from compressor node 120, decompressor node 140 extracts the CID and generation. Using the extracted CID and generation, decompressor node 140 accesses the stored header information, possibly stored in CID storage 145, then generates a packet header including all information originally contained in the uncompressed header received at compressor node 120. Then, decompressor node 140 may forward an uncompressed packet, i.e. the original packet sent by source node 110, to destination node 150.

Destination node 150 may be any device that receives data transmitted from source node 110. Thus, as with source node 110, destination node 150 may be, for example, a user node, a router or switch, a service provider, a server, or a similar system that receives data from a user or other network node.

According to various exemplary embodiments, compressor node 120 includes components that interact to ensure that compressed header packets are properly transmitted and routed upon an LCR switch. In the operation of these embodiments, each line card 123, 124 maintains a line card activity number, described in further detail below with respect to FIG. 2. Whenever one of the line cards 123, 124 detects a change in designation from inactive to active, the line card will update its line card activity number to a new value. Upon receiving a packet from a new flow and assigning a CID to the flow, line cards 123, 124 each associate the flow and CID with a flow activity number, described in further detail below with respect to FIG. 3. Initially, the flow activity number is set equal to the current value of the line card activity number.

According to various exemplary embodiments, when line cards 123, 124 receive a packet from a flow that already has an assigned CID, each line card will check to ensure that the flow activity number associated with the assigned CID is equal to the current line card activity number. If the two values are unequal, the line card may infer that the card has changed from inactive to active since last informing the decompressor node 140 of its CID assignments. Accordingly, in order to ensure that the decompressor node 140 has the most recent CID, the flow will enter the slow start mode which includes incrementing the generation. In various embodiments, incrementing the generation for a flow will actually trigger slow start mode for the flow. The line card will then update the flow activity number so that it equals the current line card activity number.

It should be apparent that the above description of the operation of compressor node 120 is intended to provide an overview of the operation of compressor node 120 and is a simplification in some respects. The detailed operation of the components of compressor node 120 will be described in further detail with reference to FIG. 4.

Figure 2:
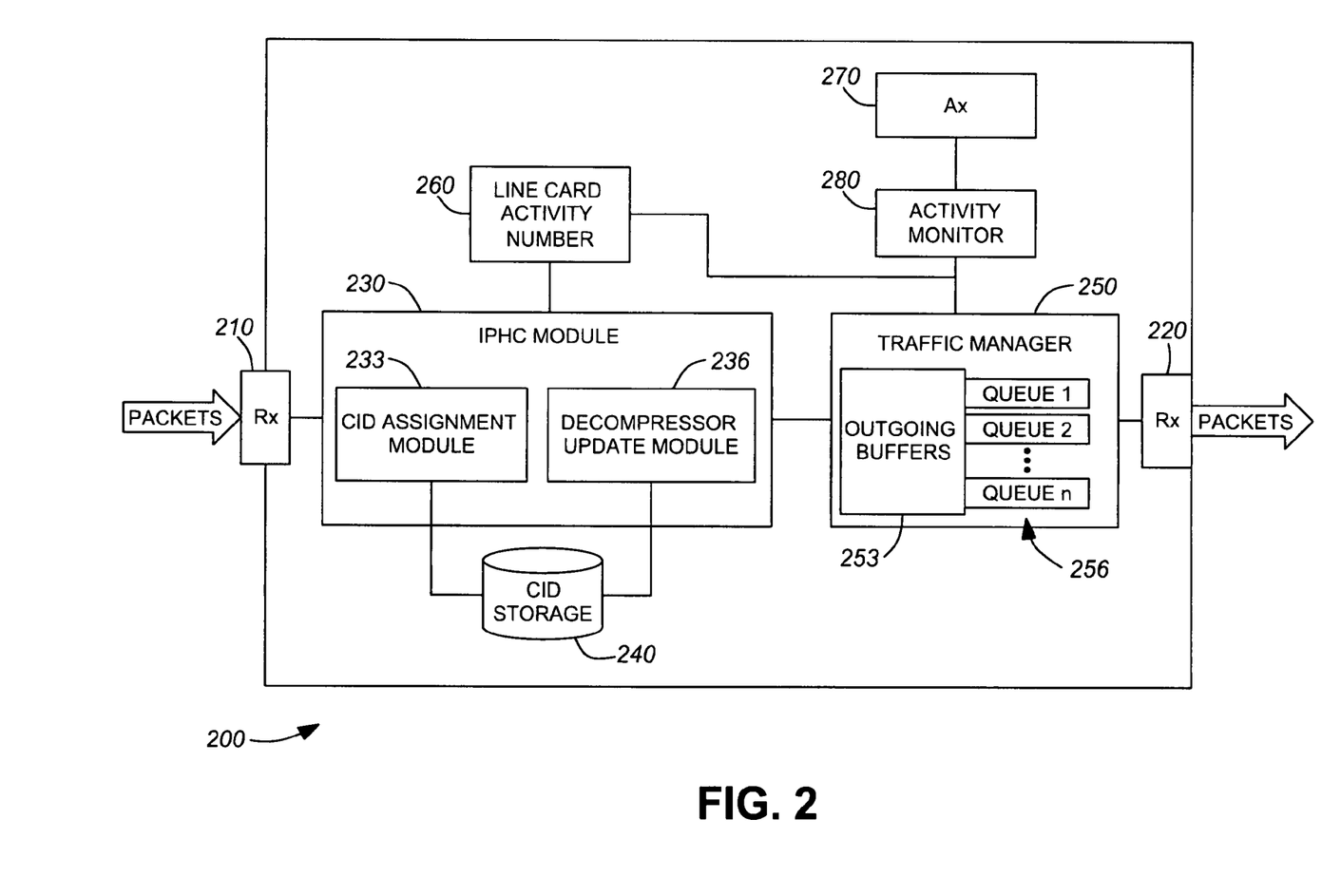
FIG. 2 is a schematic diagram of an exemplary line card for use in the compressor node of FIG. 1.

FIG. 2 is a schematic diagram of an exemplary line card 200 for use in compressor node 120 of FIG. 1. Line card 200 may correspond to line card 123 and/or line card 124. Line card 200 may include a receiver 210, through which packet data is received. Likewise, line card 200 may include a transmitter 220, through which packet data is transmitted.

Line card 200 may further include an IP header compression (IPHC) module 230 which, utilizing data stored in CID storage 240, as described in detail below with reference to FIG. 3, performs all header compression operations on received packets before retransmission. IPHC module 230 may include a CID assignment module 233 and a decompressor update module 236. CID assignment module 233 may identify new flows, assign CIDs to each flow, and store records in CID storage 240 to keep track of each CID assignment. Utilizing CID storage 240, decompressor update module 236 may determine when a full header should be sent in order to ensure decompressor node 140 has an accurate record of the CID assignment for a flow in CID storage 145.

A traffic manager 250 may further be included in line card 200. Traffic manager 250 may include at least one buffer 253 for outgoing packets and/or a number of outgoing packet queues 256. Traffic manager 250 may implement various traffic management functions, such as, for example, determining the order of packets transmitted and flushing the outgoing buffer.

In various exemplary embodiments, line card 200 includes memory for storing a line card activity number 260, the value of which may be stored with CID assignment records in CID storage 240, as described in detail below with reference to FIG. 3. When line card 200 receives a packet belonging to a flow which already has an assigned CID, the value of line card activity number 260 will be compared to the activity number stored with the assigned CID in CID storage 240. If these values are unequal, the line card 200 will enter slow start mode for that flow because line card's designation has changed to active since the last slow start for the present flow. Triggering slow start in this manner ensures that the corresponding decompressor is aware of the most recent CID assigned to the flow.

In one alternative embodiment, line card 200 may maintain multiple line card activity numbers 260. According to this embodiment, each maintained line card activity number 260 corresponds to a bundle of flows. Each bundle of flows might contain multiple flows or only a single flow. When a packet belonging to a flow is received by a line card 200 designed according to this embodiment, the stored flow number will be checked against the line card activity number 260 corresponding to the flow, with no regard for any of the other line card activity numbers.

Thus, if line card 200 maintains two line card activity numbers, the first line card activity number will correspond to a first bundle of flows and the second line card activity number will correspond to a second bundle of flows. If a packet is received that belongs to Flow A and Flow A belongs to the first bundle of flows, line card 200 will compare the stored flow activity number to only the first line card activity number in determining whether slow start mode should be entered.

Line card 200 may further include an activity interface 270 through which line card 200 is signaled when its designation changes from active to inactive or from inactive to active. Activity interface 270 may be monitored by an activity monitor 280. Upon detecting an activity change for line card 200, activity monitor 280 may change the value of the line card activity number 260. For example, activity monitor 280 may increment the value of the line card activity number 260, generate a random number to become the new line card activity number 260, or use another method known to those skilled in the art.

In various exemplary embodiments, activity monitor 280 may additionally signal traffic manager 250, indicating that outgoing buffer(s) 253 and/or queues 256 must be flushed. Thus, when switched to active, line card 200 will not transmit compressed header packets previously buffered but not yet transmitted, as these packets would likely be either dropped or incorrectly routed by the decompressor node 140. The buffer 253 and/or queues 256 may be flushed of all packets or only compressed header packets because any full header packets, though buffered while line card 200 was inactive, will be properly handled by decompressor node 140.

It should be apparent that each element of line card 200 (receiver 210, transmitter 220, IPHC module 230, CID storage 240, traffic manager 250, line card activity number 260, activity interface 270, and activity monitor 280) constitutes hardware, software encoded on a machine-readable medium, or a combination thereof. Hardware used may include processors, field-programmable gate arrays (FPGA), network interfaces, or any other hardware known to a person skilled in the art. A machine-readable storage medium may include any mechanism for storing information in a form readable by a machine, such as a network node (e.g. router or switch). Thus, a machine-readable storage medium may include read-only memory (ROM), random-access memory (RAM), magnetic disk storage media, optical storage media, flash-memory devices, and similar storage media.

Figure 3:
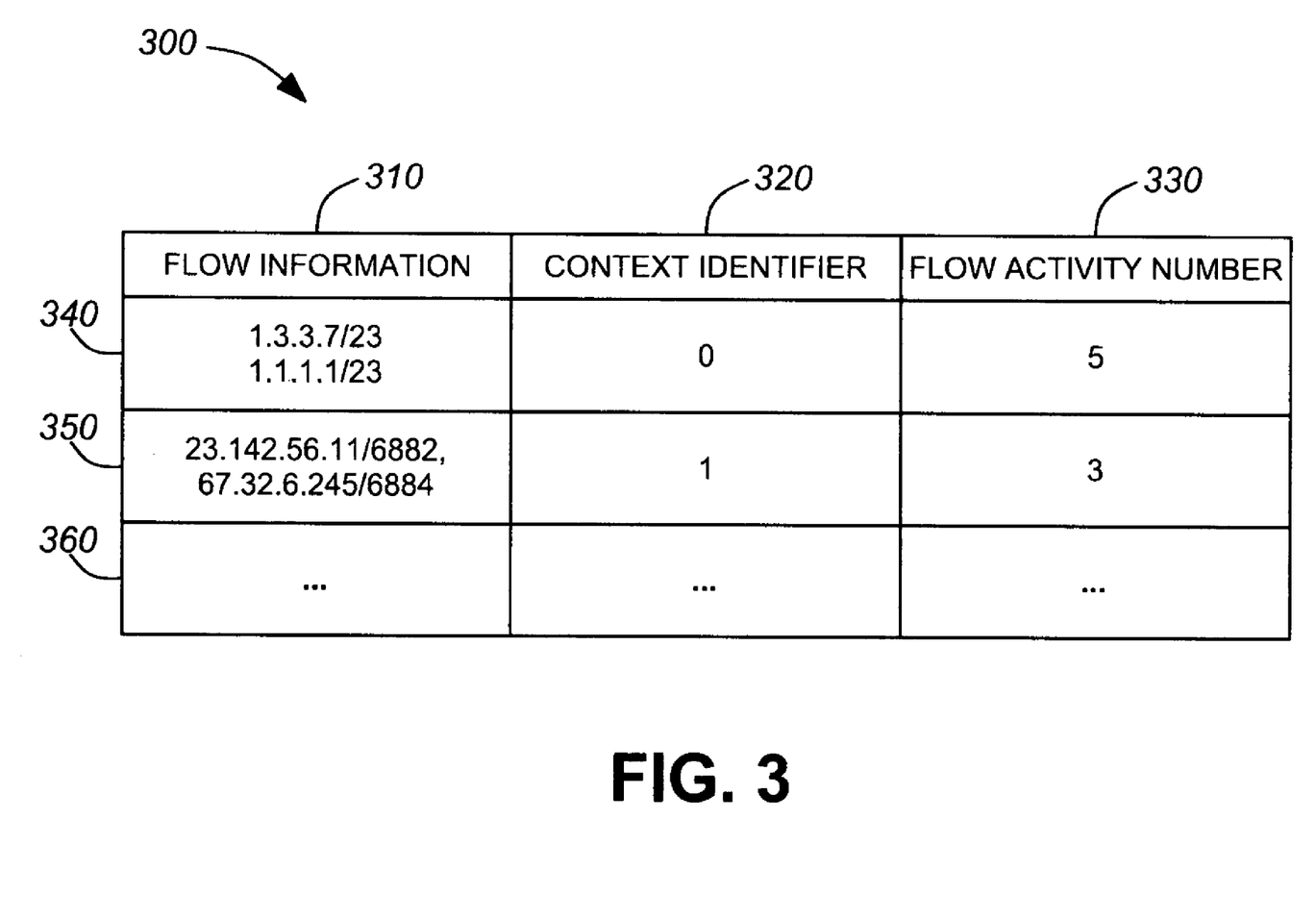
FIG. 3 is a schematic diagram of an exemplary data arrangement for use in the context identifier storage of FIG. 2.

FIG. 3 is a schematic diagram of an exemplary data arrangement 300 for use in CID storage 240 of FIG. 2. Data arrangement 300 may be, for example, a table in a database stored in context identifier storage 240. Alternatively, data arrangement 300 could be a series of linked lists, an array, or a similar data structure. Thus, it should be apparent that data arrangement 300 is an abstraction of the underlying data; any data structure suitable for storage of this data may be used.

Data arrangement 300 may include three sets of data: flow information field 310, context ID field 320, and flow activity number field 330. Flow information field 310 may indicate any information necessary to uniquely identify a flow such as, for example, source and destination IP addresses and port numbers. Context ID field 320 may be a unique value assigned by IPHC module 230 to identify a compression context between a node operating as a compressor and a node operating as a decompressor. Context ID field 320 includes the current generation value associated with the corresponding context identifier.

Flow activity number field 330 may be a number corresponding to the line card activity number 260 at the present or some previous time. In various embodiments, upon adding a new record to CID Storage 240, the flow activity number field 330 will be set equal to the line card activity number 260. When line card 200 determines that the flow activity number 330 for a particular flow is not the same as the value of line card activity number 260, line card 200 is then aware that its designation has changed from inactive to active since the last time line card 200 received data for that flow. Line card 200 may subsequently enter slow start mode for the flow.

As an example, data 340 indicates the source IP address, source port, destination IP address, and destination port of a first flow. The CID associated with this flow is 0, while the flow activity number is 5. As another example, data 350 indicates the source IP address, source port, destination IP address, and destination port of a second flow. The CID associated with this flow is 1, while the flow activity number associated with the flow is 3. Data arrangement 300 may include numerous other data entries 360.

Figure 4:
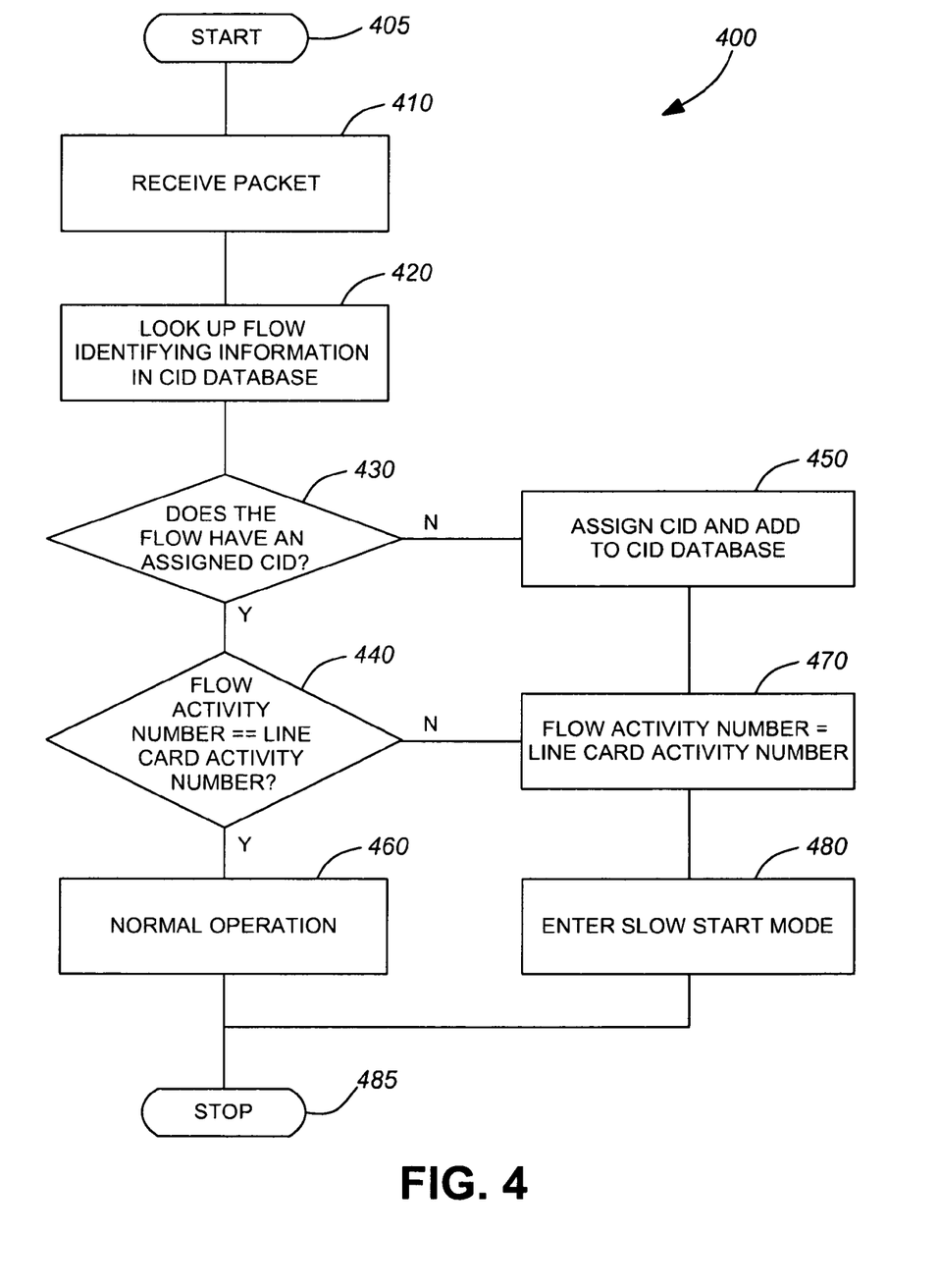
FIG. 4 is a flowchart of an exemplary method for updating the context identifier storage of the decompressor node in FIG. 1.

FIG. 4 is a flowchart of an exemplary method 400 for updating the context identifier storage of the decompressor node 140 upon an LCR switch. Method 400 may, for example, be implemented by line card 200 to ensure the proper transmission and receipt of compressed header packets after an LCR switch.

Exemplary method 400 starts in step 405 and proceeds to step 410, where line card 200 receives a packet belonging to a flow of packets from source node 110 to destination node 150. Method 400 then proceeds to step 420. At step 420, CID Assignment Module 233 determines the flow identification information from the packet and accesses CID storage 240 to find a corresponding record, if one exists.

Exemplary method then proceeds to step 430, where CID assignment module 233 determines whether the flow already has an assigned CID. If the flow does have an assigned CID, the method proceeds to step 440. Otherwise, the method proceeds to step 450, where CID assignment module 233 assigns a CID to the flow, adds a corresponding record to CID storage 240, and proceeds to step 470.

At step 440, decompressor update module 236 determines whether the flow activity number is equal to line card activity number 260. Recall that in various embodiments, activity monitor 280 will change line card activity number 260 upon receiving a signal via activity interface 270 indicating that the line card's 200 designation has changed from inactive to active. Therefore, while the flow activity number may initially be set equal to line card activity number 260, a change in activity designation will, in various embodiments, leave the two values unequal.

If, at step 440, it is determined that the line card activity number 260 and flow activity number are equal, the method proceeds to step 460, where the packet is forwarded under the rules of normal operation, and then terminates at step 485. This scenario will occur when line card 200 has not changed from inactive to active since the last packet for that flow. If, however, it is determined that the line card activity number 260 is not the same as the flow activity number, i.e. line card 200 has changed to active since the last packet, the method proceeds to step 470.

At step 470, the flow activity number in CID storage 240 is set equal to the current value of line card activity number 260. The method then proceeds to step 480, where the line card enters a slow start mode for that flow, as described above, in order to ensure that decompressor CID storage 145 is up to date with line card CID storage 240 with respect to the flow of the packet being processed. The method then terminates at step 485.

As an example of the operation of line card 200 and method 400, suppose line card 200 is currently inactive, line card activity number 260 is currently equal to 3, and CID storage 240 currently reflects the information of table 300. Upon detecting a change in designation to active, activity monitor 280 changes line card activity number 260 to equal 5. Next, a packet is received belonging to the flow described by data 350. After it is determined by CID assignment module 233 that CID 1 has already been assigned to the flow, the decompressor update module 236 determines that the flow activity number (3) is not equal to the line card activity number 260 (5). The decompressor update module 236 then updates data 350 to reflect the current line card activity number 260 and enters a slow start mode to ensure that decompressor node 140 knows CID 1 will now be used to identify the flow described by data 350.

According to the foregoing, various exemplary embodiments ensure that the decompressor is kept up to date with the context identifiers used by the newly active line card upon an LCR switch. In particular, the various exemplary embodiments ensure that, upon an LCR switch, the newly active line card transmits full header packets for each flow to the decompressor. Furthermore, various exemplary embodiments ensure that compressed header packets already buffered for transmission are not sent to the decompressor upon an LCR switch, as these packets would likely be discarded or incorrectly routed by the decompressor.

It should be apparent from the foregoing description that various exemplary embodiments of the invention may be implemented in hardware, firmware, and/or software. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a network node (e.g. router or switch). Thus, a machine-readable storage medium may include read-only memory (ROM), random-access memory (RAM), magnetic disk storage media, optical storage media, flash-memory devices, and similar storage media.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications may be implemented while remaining within the spirit and scope of the invention. Accordingly, the foregoing disclosure, description, and figures are for illustrative purposes only and do not in any way limit the invention, which is defined only by the claims.

What is claimed is:

1. A method, performed at a compressor node including a first line card initially designated active and a second line card initially designated inactive, the method for updating a context identifier storage of a decompressor node in a communications network, the method comprising:
   maintaining, at each line card, a line card activity number;
   receiving a first packet belonging to a flow;
   storing, at each line card, a flow record in a line card context identifier storage, wherein the flow record contains flow identifying information, a flow context identifier, and a flow activity number, the flow activity number being initially set equal to a current value of the line card activity number;
   detecting, by the second line card, a change in designation to active and subsequently changing the value of the line card activity number maintained by the second line card to an updated line card activity number;
   receiving a second packet belonging to the flow;
   determining, by the second line card, the flow activity number and the flow context identifier associated, in the line card context identifier storage, with the flow; and
   transmitting, to the decompressor node, an update packet including the flow context identifier and the flow identifying information upon determining that the flow activity number is not equal to the updated line card activity number.

2. The method of claim 1, wherein each line card context identifier storage stores flow records for a plurality of flows.

3. The method of claim 2, wherein each line card maintains a plurality of line card activity numbers.

4. The method of claim 3, wherein each flow of the plurality of flows corresponds to one of the plurality of line card activity numbers.

5. The method of claim 1, wherein the update packet includes a payload of the second packet.

6. The method of claim 5, wherein the update packet is the second packet.

7. The method of claim 1 further comprising:
   entering a slow start mode for the flow upon determining that the flow activity number is not equal to the updated line card activity number.

8. The method of claim 1 further comprising:
   removing packets that do not contain a full header from at least one of an outgoing packet buffer of the second line card and an outgoing packet queue of the second line card upon detecting a change in designation to active.

9. A network node adapted to update a context identifier storage of a decompressor node in a communications network, the network node comprising:
   a network interface that receives a first packet belonging to a flow and a second packet belonging to the flow;
   a first line card initially designated active and a second line card initially designated inactive, each line card comprising:
      a receiver that receives the first packet and the second packet from the network interface,
      a memory that stores a line card activity number,
      a context identifier assignment module that assigns a context identifier to the flow upon receiving the first packet,
      a storage that maintains a correspondence between each flow, assigned context identifier, and a corresponding flow activity number, each flow activity number being initially set equal to the line card activity number,
      an activity monitor adapted to:
         detect a change in line card designation to active, and
         update the memory to store an updated line card activity number upon detecting a change in line card designation to active, and
      a decompressor update module configured to:
         determine a flow activity number and an assigned compression number corresponding to the flow upon receiving the second packet,
         determine that the flow activity number is not equal to the line card activity number, and
         transmit, to the decompressor node, a full header-packet including the assigned context identifier, a generation number, and information identifying the flow upon determining that the flow activity number is not equal to the updated line card activity number.

10. The network node of claim 9, wherein the memory of each line card is adapted to store a plurality of line card activity numbers.

11. The network node of claim 10, wherein each flow corresponds to one of the plurality of line card activity numbers.

12. The network node of claim 9, wherein the update packet includes the payload of the second packet.

13. The network node of claim 9, wherein the compressor module is further adapted to enter a slow start mode upon determining that the flow activity number is not equal to the line card activity number.

14. The network node of claim 9, wherein the line cards further comprise:
a traffic manager adapted to remove, from at least one of an outgoing packet buffer and an outgoing packet queue, packets that do not contain a full header, upon detecting a change in designation to active by the activity number processing module.

15. A line card adapted to update a context identifier storage of a decompressor node in a communications network, the line card comprising:
a receiver that receives a first packet belonging to a flow and a second packet belonging to the flow;
a memory that stores a line card activity number;
a context identifier assignment module that assigns a context identifier to the flow upon receiving the first packet;
a context identifier storage that maintains a correspondence between each flow, assigned context identifier, and a corresponding flow activity number, each flow activity number being initially set equal to the line card activity number;
an activity monitor adapted to:
detect a change in a line card designation to active, and
update the memory to store an updated line card activity number upon detecting a change in line card designation to active; and
a decompressor update module adapted to:
determine a flow activity number and an assigned compression number corresponding to the flow upon receiving the second packet,
determine that the flow activity number is not equal to the line card activity number, and
transmit, to the decompressor node, an update packet including the assigned context identifier and information identifying the flow upon determining that the flow activity number is not equal to the updated line card activity number.

16. The line card of claim 15 wherein the memory is adapted to store a plurality of line card activity numbers.

17. The line card of claim 16 wherein each flow corresponds to one of the plurality of line card activity numbers.

18. The line card of claim 15 wherein the update packet includes the payload of the second packet.

19. The line card of claim 15 wherein the compressor module is further adapted to enter a slow start mode upon determining that the flow activity number is not equal to the line card activity number.

20. The line card of claim 15 further comprising:
a traffic manager adapted to remove, from at least one of an outgoing packet buffer and an outgoing packet queue, packets that do not contain a full header, upon detecting a change in designation to active by the activity number processing module.

\* \* \* \* \*